(No Model.)
D. DOWD.
BAND CUTTER AND FEEDER FOR THRASHING MACHINES.
No. 290,547. Patented Dec. 18, 1883.
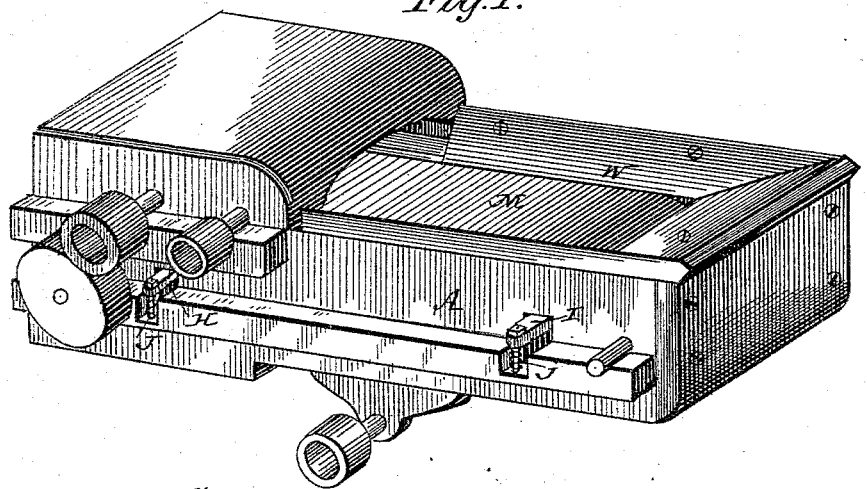
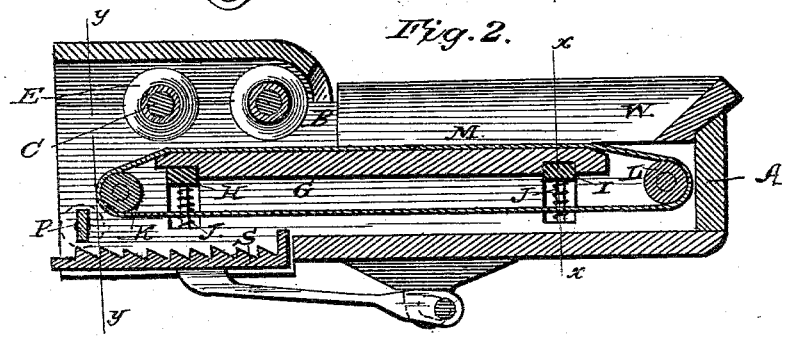
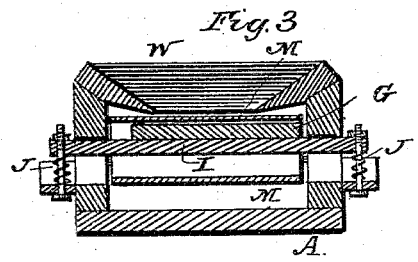
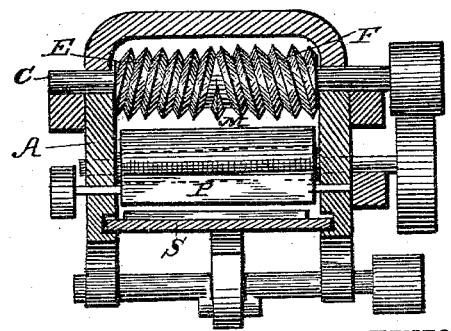
WITNESSES:
Fred. G. Dieterich
J. Fred. Reilly
INVENTOR.
Daniel Dowd
By Louis Bagger & Co.
ATTORNEYS.

UNITED STATES PATENT OFFICE.

DANIEL DOWD, OF LA RUE, OHIO.

BAND-CUTTER AND FEEDER FOR THRASHING-MACHINES.

SPECIFICATION forming part of Letters Patent No. 290,547, dated December 18, 1883.

Application filed October 26, 1883. (No model.)

*To all whom it may concern:*

Be it known that I, DANIEL DOWD, a citizen of the United States, residing at La Rue, in the county of Marion and State of Ohio, have invented certain new and useful Improvements in Band-Cutters and Feeders for Thrashing-Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved band-cutter and feeder for thrashing-machines. Fig. 2 is a longitudinal vertical sectional view of the same. Fig. 3 is a cross-sectional view of the same through line $x\ x$, Fig. 2; and Fig. 4 is a similar view through line $y\ y$ in the same figure.

The same letters of reference indicate the same or corresponding parts in all the figures.

My invention has relation to band-cutters and feeders for thrashing-machines; and it consists in certain new and useful improvements on the invention for which Letters Patent No. 279,725 were granted to me, bearing date of June 19, 1883, as will be hereinafter more fully described and claimed.

In the accompanying drawings, A represents the frame or casing of my improved cutter and feeder, which is of such a shape as to adapt it to be attached to any thrashing-machine of ordinary or suitable construction, so that the grain will be fed from it to the concave of the thrashing-machine.

B represents the cutting-cylinder, which is precisely similar in construction to the cutting-cylinder shown in my patent mentioned above, and which, therefore, forms no part of my present invention.

Fixed in the rear end of the frame or casing A is a shaft or cylinder, C, provided with spiral flanges E F, the said flanges meeting at the center of the shaft C, and curving spirally toward each end of the said shaft—that is to say, one of them, F, is a right-hand spiral, while the other, E, is a left-hand spiral—for the purpose hereinafter described.

G represents a platform, which is adjustably secured within the main frame or casing A by having its ends rigidly secured upon cross-pieces H I, the ends of which rest upon spring-supports J, which allow the platform to yield to any unusual pressure. The platform is of such a length as to fit between the rollers K L, around which the endless apron M passes, and of such a thickness as to allow the said apron to work freely around it. The vibrating shoe S shown in the drawings is of a similar construction and operates in the same manner as the vibrating shoe shown and claimed in my patent previously referred to.

In the rear end of the frame or casing A, near the end of the apron, is journaled a beater, P, operated by a belt from the cutting-cylinder, the object of which is to prevent straw from working down, as would otherwise be the case.

The operation of my improved cutter and feeder is as follows: The bundles of grain are fed into the cutter and feeder through the opening W at the front end of the same, and are carried by the endless apron M underneath the cutting-cylinder B, by which the bands are cut, and the loose grain is fed between the apron and the shaft C, having the right and left spirals or flanges E F, by which the grain is effectually scattered and loosened, so that it will be delivered to the concave of the machine in a thin and even layer.

From the foregoing description, taken in connection with the accompanying drawings, the construction and operation of my improved cutter and feeder will readily be understood without requiring further explanation.

By supporting the platform G upon spring-supports J, as previously described, the sheaf passing over the feed-apron will always be held within operative distance of the band-cutting knives and the spiral flanges E F, as will be readily understood without further explanation.

Having thus described my invention, I claim and desire to secure by Letters Patent of the United States—

As an improvement in band-cutters and feeders, the combination of the endless traveling apron M, the cutting-cylinder B, and cylinder C, having spiral flanges adapted to work the grain from the center toward each edge of the traveling apron M, the platform G, and suitable spring-supports for said platform, as and for the purpose shown and set forth.

In testimony that I claim the foregoing as my own I have hereunto affixed my signature in presence of two witnesses.

DANIEL DOWD.

Witnesses:
T. P. DODD,
R. P. DAVIES.